United States Patent [19]
Matsuura et al.

[11] Patent Number: 4,818,255
[45] Date of Patent: Apr. 4, 1989

[54] MATERIAL FOR GAS SEPARATION

[75] Inventors: Junichi Matsuura, Kamakura; Tatsuki Oguchi, Kawagoe; Munehisa Okada, Tokyo, all of Japan

[73] Assignee: Kozo Director-general of Agency of Industrial Science and Technology Iizuka, Tokyo, Japan

[21] Appl. No.: 154,043

[22] Filed: Feb. 9, 1988

[30] Foreign Application Priority Data

| Feb. 10, 1987 | [JP] | Japan | 62-27216 |
| Feb. 10, 1987 | [JP] | Japan | 62-27217 |
| Feb. 28, 1988 | [JP] | Japan | 63-15936 |

[51] Int. Cl.$^4$ .................. B01D 53/04; B01D 53/22
[52] U.S. Cl. ................................ 55/16; 55/68; 55/74; 55/158; 55/387; 252/190; 423/247
[58] Field of Search ............ 55/16, 68, 74, 158, 55/387; 423/246, 247; 252/189, 190; 585/818, 819, 845, 849

[56] References Cited

U.S. PATENT DOCUMENTS

| 3,415,615 | 12/1968 | Blytas et al. | 423/246 |
| 3,658,463 | 4/1972 | Billings | 423/246 |
| 3,790,662 | 2/1974 | Lloyd et al. | 423/246 X |
| 3,823,529 | 7/1974 | Hughes et al. | 55/16 |
| 4,102,802 | 7/1978 | Johnson et al. | 55/68 X |
| 4,277,452 | 7/1981 | Kanehori et al. | 423/246 |
| 4,279,874 | 7/1981 | Doyle | 55/68 X |
| 4,347,066 | 8/1982 | Doyle | 423/246 X |
| 4,508,694 | 4/1985 | Doyle et al. | 423/246 |
| 4,564,373 | 1/1986 | Schmitz et al. | 55/16 |
| 4,662,905 | 5/1987 | Matsuura et al. | 55/68 X |

FOREIGN PATENT DOCUMENTS

| 137028 | 10/1980 | Japan | 55/16 |
| 19013 | 2/1982 | Japan | 55/68 |
| 365222 | 2/1984 | Japan | 55/68 |
| 33209 | 2/1985 | Japan | 55/68 |
| 90722 | 5/1986 | Japan | 55/16 |
| 103519 | 5/1986 | Japan | 55/68 |
| 268338 | 11/1986 | Japan | 55/68 |
| 49928 | 3/1987 | Japan | 55/16 |
| 52-117 | 3/1987 | Japan | 55/68 |
| 52-118 | 3/1987 | Japan | 55/68 |
| 202810 | 9/1987 | Japan | 423/246 |
| 882587 | 11/1981 | U.S.S.R. | 423/246 |

*Primary Examiner*—Robert Spitzer
*Attorney, Agent, or Firm*—Oblon, Fisher, Spivak, McClelland & Maier

[57] ABSTRACT

A material for gas separation obtained by mixing a copper compound and a benzoin and/or an ascorbic acid in a solvent.

21 Claims, No Drawings

MATERIAL FOR GAS SEPARATION

BACKGROUND OF THE INVENTION

1. FIELD OF THE INVENTION

The present invention relates to a material for gas separation. More particularly, it relates to a material for gas separation composed of a reaction mixture obtained by mixing a copper compound and a benzoin and/or an ascorbic acid in a solvent, particularly at least one member selected from the group consisting of an imidazole, a pyridine and a polyethylenepolyamine, and to a composition for gas separation comprising such a reaction mixture or a reaction product of oxygen with such a reaction mixture and an alkene complex of palladium. The present invention relates also to a selective gas permeation membrane having the material or composition for gas separation supported on a supporting membrane and to a method for gas separation wherein such a selective gas permeation membrane is used. Further, the present invention relates to a method for gas separation wherein the material or composition for gas separation is used as a selective gas absorbing solution.

2. DISCUSSION OF BACKGROUND

Separation technique useful for the separation, concentration and purification of carbon monoxide from a gas formed by the steam refining or partial oxidation of hydrocarbons such as natural gas, light naphtha or heavy oil or from an iron making byproduct gas such as converter gas, blast furnace gas or coke oven gas, is important in the chemical industry for the purification of the starting material gas in the ammonia synthesis and for the production of starting materials for the preparation of various chemical industrial products.

For the separation and concentration of carbon monoxide from a gas mixture containing carbon monoxide, various methods have been practically employed such as a cryogenic separation method, an absorbing solution method, an adsorption method and a membrane method. However, each of these methods has its own technical problems.

The cryogenic separation method requires a complicated freezing and heat recovery system, and the operational temperature is low, whereby it is necessary to use a high quality material as the material of the apparatus, thus leading to a high installation cost. Further, for the low temperature operation, the power consumption is large. Further, in order to prevent clogging in the apparatus, it is necessary to install a pretreatment installation and preliminarily completely remove impurities from the gas.

For the absorbing solution method, it has been in practice since long ago to use an aqueous cuprous chloride solution acidified with hydrochloric acid or an ammoniacal aqueous cuprous chloride solution as the absorbing solution for carbon monoxide. However, this method has difficulties such as the highly corrosive property of the absorbing solution, the formation of precipitates and the high installation cost. In recent years, an absorbing solution method which is called COSORB process wherein a toluene solution of a copper aluminum chloride is used as the absorbing solution for carbon monoxide, has been developed and practically in use. According to this method, the impurities in the gas, particularly carbon dioxide which must have been removed by pretreatment in the above-mentioned method, are not absorbed, whereby the separated and purified carbon monoxide has a high purity. On the other hand, when contacted with a gas mixture containing water, hydrogen sulfide or ammonia, the copper chloride-aluminum chloride complex in the absorbing solution irreversibly reacts with these impurities, whereby the absorbing power of the absorbing solution for carbon monoxide will be impaired. Further, heating is required for releasing carbon monoxide from the absorbing solution.

With respect to the adsorbing method, an adsorbing method employing zeolite as the adsorber has recently been developed, and operation of a practical machine has started for e.g. converter gas. According to this method, the operation can be conducted at room temperature, and the apparatus may be of a small scale. Further, as opposed to the conventional absorbing solution method, this method is free from a problem of the evaporation of the solvent, and a stabilized catalytic operation can be ensured. On the other hand, the difference in the adsorbing properties among gases of different types is small, and it is rather difficult to obtain highly pure carbon monoxide by a single step particularly when the carbon monoxide concentration is low, although the method may be suitable for use when the concentration of carbon monoxide in the gas is high as in the case of converter gas. Further, in the case of zeolite, carbon dioxide is more readily adsorbed than carbon monoxide, and therefore, it is necessary to preliminarily remove carbon dioxide. Furthermore, the adsorption is required to be conducted under pressure, and the desorption is required to be conducted under reduced pressure. Thus, the operational cost is large.

Finally, with respect to the membrane method, various polymer membranes have been studied for membranes for the separation of gas mixtures. However, when a usual polymer membrane is used alone, carbon monoxide is less permeable than other gas such as hydrogen. Accordingly, this method may be practically useful for the purpose of separating hydrogen from a gas mixture containing an excess amount of hydrogen by letting it pass through the membrane to change the proportions of hydrogen and carbon monoxide in the remaining gas. However, it is not practically useful for the purpose of obtaining carbon monoxide at a high concentration because the selectivity is low. With a polymer membrane, the gas permeability constant is small. However, if the film is liquid, the gas solubility constant or diffusion constant is large, and it is thereby possible to have a large permeability constant. Further, when a substance having an reversible interaction selectively with a certain gas, is contained in such a liquid film, the permeability of the gas can further be increased. On the other hand, the selectivity of a film may be provided also by the difference in the solubility in the film of various gases or by the diffusion rate in the film of various gases. Therefore, when a substance having a reversible interaction selectively with a certain gas, is contained in the film, as mentioned above, the solubility of the particular gas can be increased exclusively, whereby the selectivity can be made remarkably high. Many instances have been known with respect to such films containing substances having an reversible interaction selectively with certain gases. For example, there have been known the separation of carbon dioxide by means of an aqueous solution of an alkali metal hydrogencarbonate (Japanese Examined Patent Publication No. 1176/1970), the separation of an olefin by means of an aqueous silver nitrate solution (Japanese Examined Patent Publication No. 31842/1978) and the separation of nitrogen monoxide by means of a formamide solution of ferrous chloride (A.I.Ch.E. Journal, vol. 16, No. 3, p. 405, 1970). These liquid films are used as supported on membranes as supporting members. Further, for the separation of carbon monoxide, an aqueous hydrochloric acid solution of copper chloride is known. This method has a drawback that it is necessary to use a highly concentrated aqueous hydrochloric acid solution. Further, when the secondary side (effluent side) of the permeation is kept under reduced pressure, there is a drawback that hydrochloride gas tends to permeate and mingle with other gas.

As described in the foregoing, various methods for separating carbon monoxide have been developed, but each of them has its own merits and demerits, and a further improvement has been desired with respect to the drawbacks.

SUMMARY OF THE INVENTION

The present inventors have conducted extensive research with an aim to develop a material useful for selective gas separation which is excellent in the selective absorptive separating performance for carbon monoxide and capable of absorbing for separation at room temperature, whose absorption power for carbon monoxide does not deteriorate even when brought in contact with impurities such as oxygen and which is not corrosive and chemically mild and made of reagents readily available at low costs, and a selective gas permeation membrane, a selective gas absorbing solution and a selective gas adsorbing agent by means of such a material. As a result, a novel separation technique has been developed.

Firstly, the present invention provides a material for gas separation obtained by mixing a copper compound and a benzoin and/or an ascorbic acid in a solvent.

Secondly, the present invention provides a composition for gas separation comprising (a) a reaction mixture obtained by mixing a copper compound and a benzoin and/or an ascorbic acid in a solvent and (b) a reaction mixture obtained by mixing a palladium compound and an alkene in a solvent.

Thirdly, the present invention provides a composition for gas separation comprising (a) a reaction product of oxygen with a reaction mixture obtained by mixing a copper compound and a benzoin and/or an ascorbic acid in a solvent and (b) a reaction mixture obtained by mixing a palladium compound and an alkene in a solvent.

Fourthly, the present invention provides a selective gas permeation membrane comprising a supporting membrane and the above-mentioned material or composition for gas separation supported thereon.

Fifthly, the present invention provides a method for gas separation wherein the above-mentioned selective gas permeatio membrane is used.

Sixthly, the present invention provides a method for gas separation wherein the above-mentioned material or composition for gas separation is used as a selective gas absorbing solution.

Seventhly, the present invention provides a method for gas separation, wherein the above-mentioned material or composition for gas separation is used for separating carbon monoxide in good yield from a gas mixture containingcarbon monoxide.

DETAILED DESCRIPTION OF THE PREFERRED EMBODIMENTS

The material and composition for gas separation of the present invention are useful particularly for the separation and purification of carbon monoxide among gases. However, they are believed to be effective also for the separation and purification of olefins or for the separation and removal of oxygen.

Firstly, the copper compound will be described which is useful as one of the components of the material or composition for highly selective gas separation constituting a selective gas absorbing solution or a selective gas permeation membrane of the present invention. As compared with a conventional carbon monoxide absorbing solution wherein a monovalent copper salt has been mainly used, the present invention has an important feature that not only a monovalent copper salt but also a bivalent copper salt can be used as the starting material effectively or more effectively than the monovalent copper salt. There is no particular restriction as to the copper compound to be used. For example, the copper compounds disclosed at pages 4-47 to 4-49 in HACKH'S CHEMICAL DICTIONARY, 4th Edition, published by McGRAW-HILL BOOK COMPANY or the copper compounds dislcosed at pages B-109 to B-112 in HANDBOOK of CHEMISTRY and PHYSICS, 57th Edition, published by CRC PRESS, may be mentioned. Particularly preferred copper compounds include cuprous chloride, cupric chloride, cuprous bromide, cupric bromide, cuprous iodide, cuprous fluoride, cupric fluoride, cuprous thiocyanate, cupric thiocyanate, cuprous cyanide, cupric cyanide, cupric hydroxide, cupric perchlorate, cupric perbromate, cupric periodate, cupric sulfate, cupric nitrate, cupric phosphate, cupric tungstate, cupric borofluoride, various organic copper salts such as cupric formate, cupric acetate, cupric propionate, cupric oxalate, cupric tartarate, cupric citrate, cupric benzoate, cupric palmitate, cupric laurate, cupric salicylate, cupric oleate, cupric stearate, cupric acetylacetone, glycerol derivatives, hydrates of the above copper compounds and coordination compounds of ammonia, amines, pyridines and imidazoles as well as oxides obtained by the reaction of the above copper compounds with oxygen. These copper compounds may be used alone or in combination as a mixture.

Now, the benzoin to be used in the present invention will be described. Here, the benzoin includes compounds represented by the formulas:

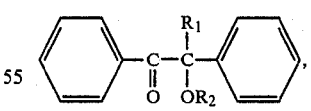

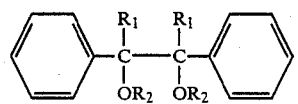

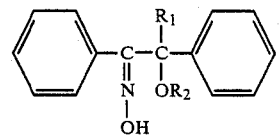

wherein $R_1$ is hydrogen or a hydrocarbon group, $R_2$ is hydrogen, a hydrocarbon group or an acetyl group, and hydrogen in the phenyl group in the formulas may be substituted by other group. Namely, it includes benzoin, hydrobenzoin, benzoinoxime, α-methylbenzoin, α-ethylbenzoin, benzoin methyl ether, benzoin ethyl ether, benzoin isopropyl ether, benzoin isobutyl ether, benzoin acetate, 4-methoxybenzoin and 3'-bromo-4-dimethylaminobenzoin. These may be used alone or in combination as a mixture. Further, α-ketols are usually effective.

There is no particular restriction as to the ratio of the benzoin to the copper compound. However, if the ratio of the benzoin to the copper compound is small, the absorbing performance of the material or composition for highly selective gas separation for carbon monoxide tends to be low, or the material or composition tends to be susceptible to the influence of the impurities such as oxygen. On the other hand, if the ratio of the benzoin to the copper compound is large, it tends to be hardly soluble in a solvent. The benzoin is used usually in an amount of from 0.1 to 10 mol, preferably from 0.5 to 5 mol, most preferably from 1 to 3 mol, per mol of the copper compound.

Now, the ascorbic acid to be used in the present invention will be described. In general, saccharides may be used, but ascorbic acids are preferred. Here, the ascorbic acid includes compounds represented by the formula:

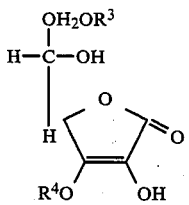

wherein $R^1$ is hydrogen or

$R^4$ is hydrogen, potassium, sodium or an alkyl group, and $R^5$ is an alkyl group, which include a D-form, a L-form and a DL-form. Specifically, it includes L-ascorbic acid stearate, L-ascorbic acid palmitate, L-ascorbic acid dipalmitate, potassium L-ascorbate and sodium L-ascorbate. These ascorbic acids may be used alone or in combination as a mixture.

There is no particular restriction as to the ratio of the ascorbic acid to the copper compound. However, if the ratio of the ascorbic acid to the copper compound is small, the absorbing performance of the material or composition for highly selective gas separation for carbon monoxide tends to deteriorate, or the material or composition tends to be susceptible to the influence of the impurities such as oxygen. On the other hand, if the ratio of the ascorbic acid to the copper compound is large, it tends to be hardly soluble in a solvent. The ascorbic acid is used usually in an amount of from 0.1 to 10 mol, preferably from 0.5 to 5 mol, most preferably from 1 to 3 mol, per mol of the copper compound.

Now, the solvent will be described which is used for dissolving the copper compound, the benzoin or the ascorbic acid of the present invention. As such a solvent, any compound capable of dissolving the copper compound, the benzoin or the ascorbic acid may be employed. However, it is preferred to employ a nitrogen-containing heterocyclic compound such as an imidazole or a pyridine or a polyalkylenepolyamine such as ethylenediamine, diethylenetriamine, triethylenetetramine, tetraethylenepentamine, heptaethyleneoctamine or nonaethylenedecamine, alone or in combination with other solvent.

The imidazole includes compounds disclosed in Grand Organic Chemistry, published by Asakura Shoten in 1967, vol. 15, p. 173-257; the pyridine includes compounds disclosed in the same literature, vol. 16, p. 1-126, and the ethylenediamine includes compounds dislcosed in the same literature, vol. 4, p. 78-82. Among them, compounds which are liquid at room temperature and have high boiling points and low vapor pressures, are most suitable.

The solvent to be used together with the above-mentioned imidazole, pyridine or ethylenediamine may be any solvent so long as it is capable of dissolving such a compound as well as the copper compound, the benzoin or the ascorbic acid and which has a high boiling point and a low vapor pressure at room temperature. Such a solvent includes ketones, esters, ethers, alcohols, amines, amides, other nitrogen-containing compounds, sulfur-containing compounds, phosphorus-containing compounds and halogen-containing compounds. These solvents may be used alone or in combination as a mixture. Preferred solvents include dimethylsulfoxide, dimethylformamide and dimethylacetamide.

There is no particular restriction as to the proportion of the solvent to the copper compound. However, the solvent is used usually in an amount within a range of from 0.1 to 3 mol per mol of the copper compound. The resulting solution is preferably a uniform solution. However, a solution in the state of a slurry containing insoluble components may also be useful. The volume ratio of the imidazole, the pyridine or the polyethylenepolyamine to the entire solvent may be optionally selected within a range of from 0:100 to 100:0.

There is no particular restriction as to the temperature for mixing the copper compound with the benzoin or the ascorbic acid in the solvent. However, the temperature is usually within a range of from 0° to 200° C., and the mixing is preferably conducted in an inert gas stream.

On the other hand, a method for oxidizing ethylene which is so-called a Wacker process wherein cupric chloride and palladium chloride are used and a method for oxidizing ethylene or propylene wherein a monovalent copper-oxygen complex and bivalent palladium are used, have been known (Japanese Unexamined Patent Publications No. 231036/1984 and No. 158131/1985). According to these methods, an alkene is oxidized by e.g. palladium (II) chloride, and the resulting zero valent palladium is reacted with a copper compound to regenerate the bivalent palladium. By this reaction, the oxidized copper is reduced to a monovalent copper.

The present inventors have conducted further research to see if the above reaction employing an alkene complex of palladium for the reduction of the oxidized copper compound can be utilized for the material for selective gas separation. As a result, it has been found possible to activate the carbon monoxide absorbing ability of the reaction mixture of the copper compound and the benzoyl and/or the ascorbic acid, which has once deteriorated by the contact with oxygen, by adding a reaction mixture of a palladium compound and an alkene to the reaction mixture obtainable by mixing the copper compound with the benzoyl and/or the ascorbic acid in a solvent, particularly a solvent containing at least one member selected from the group consisting of an imidazole, a pyridine and a polyethylenepolyamine.

As the palladium compound to be used in the present invention, a bivalent palladium compound, particularly palladium chloride, is preferred. For the formation of a complex with an alkene compound, it is preferred that a complex of a palladium compound with a nitrile such as acetonitrile, propionitrile or benzonitrile is formed as an intermediate, which is then reacted with an alkene compound to form an alkene complex of palladium. The alkene includes ethylene, propylene, butenes, pentenes, hexenes, heptenes, octenes, nonenes and decenes.

There is no particular restriction as to the ratio of the alkene complex of palladium to the copper compound. However, it is preferred that the copper compound is in an amount within a range of from 0.01 to 100 mols, particularly from 0.1 to 10 mols per mol of the alkene complex of palladium. For the formation of the alkene complex of palladium, a method may be mentioned wherein firstly a complex of the palladium compound with a nitrile is formed, and it is reacted with an alkene compound at a temperature of from 0° to 150° C. under atmospheric pressure or under elevated pressure.

There is no particular restriction as to the solvent for the nitrile complex of palladium or for the alkene complex of palladium. For example, an alcohol, an ether, an ester, a ketone, an amide, a sulfoxide, a glycol or a nitrile may be mentioned. However, a nitrile capable of forming the nitrile complex is preferably employed by itself.

There is no particular restriction as to the order for reacting or mixing the copper compound, the benzoin or ascorbic acid and the alkene complex of palladium. However, it is preferred that the copper compound and the benzoin or the ascorbic acid are firstly reacted in a solvent, followed by an addition of a solution of an alkene complex of palladium. The addition of the alkene complex of palladium to the solution of the copper compound may be conducted by adding a nitrile complex of palladium to the solution of the copper compound, followed by blowing in the alkene, or by firstly blowing ethylene in the solution of the nitrile complex of palladium to form an alkene complex of palladium and then adding the solution to the copper compound solution.

Now, the method for separating a certain specific gas, particularly carbon monoxide, by means of the material or composition for selective gas separation of the present invention will be described.

According to a first method, a gas mixture is contacted to the solution containing the above described material or composition for gas separation to selectively absorb a specific gas, particularly carbon monoxide, from the gas mixture, and then the pressure and/or the temperature is changed to release the absorbed gas. By repeating this operation, the specific gas, particularly carbon monoxide, can be separated. In this case, the pressure under which the gas is absorbed by the material or the composition for selective gas separation, is at any level so long as it is higher than 0. However, in order to increase the selectivity, the pressure is preferably as low as not higher than 1 atm. In order to increase the absorption rate of the gas, the pressure is preferably at a high level of at least 1 atm. It is usual to conduct the absorption under a pressure of from 0 to 10 atm, preferably from 0.1 to 3 atm. The releasing or desorption of the absorbed gas at room temperature is usually conducted under reduced pressure. The pressure may be at any level so long as it is lower than 1 atm. However, in order to increase the releasing rate of the gas, the pressure is preferably as low as possible, and in order to minimize the power consumption, the pressure is preferably at a high level. Usually, the releasing is conducted under a pressure of from 0 to 1 atm, preferably from 0.1 to 0.5 atm.

There is no particular restriction as to the temperature at which the gas is absorbed. However, the absorption can easily be done at a low temperature. It is usual to employ a temperature of not higher than 100° C., preferably not higher than 50° C. Likewise, there is no particular restriction as to the temperature at which the gas is released. However, in this case, the temperature is preferably high in that the releasing rate is thereby high. It is usual to employ a temperature of at least room temperature, preferably from 50° to 300° C. When the gas is released at such a high temperature, the operation may not necessarily be conducted under reduced pressure, and can effectively be conducted under a pressure of not higher than 1 atm. It is of course possible to conduct the absorption and releasing by changing both the pressure and temperature conditions. In such a case, it is preferred to conduct the absorption at a low temperature under a high pressure and the releasing at a high temperature under a low pressure.

According to a second method, the material or composition for selective gas separation of the present invention is supported on a membrane as a supporting member and let it selectively absorb a certain specific gas, particularly carbon monoxide, from the gas mixture, and the pressure at the other side of the membrane is reduced to let the gas permeate through the membrane thereby to selectively separating the specific gas, particularly carbon monoxide. In this case, there is no particular restriction as to the supporting member to be used for supporting the material or composition for selective gas separation so long as it is capable of permeating the gas. Likewise, there is no particular restriction as to the manner of supporting the material or composition for selective gas separation so long as it is thereby possible to conduct the selective permeation of the specific gas, particularly carbon monoxide. For example, there may be mentioned a method wherein the material or composition for selective gas separation in a liquid form is filled in pores in a porous supporting member, a method wherein the material or composition is impregnated in a network structure of a cross-linked polymer formed on a supporting membrane, a method wherein the material or composition is supported on the supporting membrane in the form of a liquid film having a certain thickness, or a method wherein the material or composition is dissolved or dispersed in the aligned molecules such as liquid crystals formed on a supporting member.

There is no particular restriction as to the type of material for the membrane to be used as the supporting member. For example, the supporting member may be made of an organic polymer such as regenerated cellulose, cellulose ester, polycarbonate, polyester, teflon, nylon, acetyl cellulose, polyacrylonitrile, polyvinyl alcohol, polymethyl methacrylate, polysulfone, polyethylene, polypropylene, polyviyl pyridine, polyphenyleneoxide, polyphenyleneoxide sulfonic acid, polybenzimidazole, polyimidazopyrrolone, polypiperazine amide, polystyrene, polyamino acid, polyurethane, a polyamino acid-polyurethane copolymer, polysiloxane, a polysiloxane-polycarbonate copolymer, polytrimethylvinylsilane, collagen, polyion complex, polyurea, polyamide, polyimide, polyamideimide, polyvinyl chloride or sulfonated polyfurfuryl alcohol, or an inorganic material such as glass, alumina, silica, silica alumina, carbon or metal.

Such a supporting member may be used in any form selected from flat sheet, tubular, spiral and hollow filament forms. The supporting member may be porous in its entirety or may be a uniform membrane or an anisotropic membrane having a dense layer only on its surface. Otherwise, the supporting member may be the one having a thin film of other material coated on its surface by e.g. vapor deposition, coating, polymerization or plasma polymerization. There is no particular restriction as to the entire thickness. However, the thickness is preferably within a range of from 10 to 1,000 μm. Such a supporting member may also be used as superimposed on another supporting member made of a different material.

There is no particular restriction as to the thickness of the layer of the material or composition for selective gas separation supported on such a supporting member, so long as the layer thickness is at least a few angstrom. However, when such a liquid film of the material or composition for gas separation is used in a no-stirring state, the thickness is preferably as thin as possible to obtain a large permeation rate. However, if the thickness is too thin, the permeation rates of gases other than the gas to be separated, will likewise be large, whereby the separating ability tends to deteriorate. The most suitable thickness of the layer varies depending upon the bonding and dissociating rate constants or equilibrium constants of the gas and the material or composition for gas separation, but it is usually within a range of from 0.01 to 50,000 μm, preferably from 0.1 to 10,000 μm. When the liquid film is used under stirring, the film thickness may be thick, but the effective film thickness serving as a diffusing layer at the surface of the supporting membrane is preferably the same as the film thickness in the case of no-stirring.

Various methods may be considered for the separation of gases. For instance, it is possible to employ a method wherein a membrane having the material or composition for gas separation supported on a supporting member is used so that the partial pressure of the gas to be separated is differentiated as between both sides of the membrane, or a method wherein a reservoir for an absorbing solution of the material or composition for gas separation is provided separately from the membrane cell, and the absorbing solution is supplied by a pump from the reservoir to the surface of the supporting membrane of the membrane cell (the primary side of the membrane) and recycled. In the latter method, e.g. carbon monoxide may be absorbed on the membrane surace, and the solution having carbon monoxide absorbed is led to a separate container, whereupon carbon monoxide is released under reduced pressure, or inversely, carbon monoxide may be absorbed in the absorbing solution in the reservoir, and the solution having carbon monoxide absorbed is supplied to the membrane cell, where the secondary side of the membrane is kept under reduced pressure so that the gas i.e. carbon monoxide dissolved or absorbed is continuously released or desorbed and led to the secondary side of the membrane, while the solution freed from carbon monoxide is returned to the reservoir and used again for absorption of carbon monoxide. In this case, the withdrawal of carbon monoxide can be facilitated by differentiating the temperatures of the membrane cell and the reservoir. For example, the membrane cell portion may be held at a temperature within a range of from 0° to 200° C.

As a third method, the material or composition for selective gas separation may be supported on a particle-form carrier. Such a carrier may be made of the same material as used for the above described supporting membrane.

In general, a substance having an affinity to a certain specific gas only is referred to as a carrier (for example, the substance is referred to as a CO carrier when the specific gas is carbon monoxide). In a flowable carrier membrane wherein a solution containing a carrier is supported on a membrane as a supporting member, the gas selectively bonded to the carrier and other gases are different in the behavior in the pressure dependency of the solubility in the carrier solution. Within a pressure range of not higher than 1 atm, the former gas has a large ratio of the solubility in the carrier solution to the pressure (solubility/pressure) at the low pressure side and a small ratio of the solubility to the pressure at the high pressure side. Namely, in a low pressure region, the solubility changes remarkably even with a small change in the pressure, while in a pressure region close to 1 atm, the solubility does not substantially change even when the pressure is varied. Whereas, with the latter gases, the ratio of the solubility to the pressure is constant, and Henry's law is applicable. Accordingly, when carbon monoxide is separated by means of a flowable carrier membrane from a gas mixture containing carbon monoxide, if the separation and purification is conducted for the purpose of obtaining carbon monoxide, it is preferred to adjust the pressure of the feed gas to a low pressure level of not higher than 1 atm to obtain high selectivity. Inversely, for the purpose of obtaining the other gas by removing carbon monoxide, it is preferred to adjust the pressure of the feed gas to a high level of at least 1 atm to increase the production rate of the other gas.

Thus, for the separation and purification of carbon monoxide from an iron-making byproduct gas or from a gas mixture of hydrogen/carbon monoxide by means of a flowable carrier membrane wherein the material or composition for gas separation of the present invention is supported on a membrane as a supporting member, it is possible to obtain a gas mixture having a higher concentration of carbon monoxide by increasing the selectivity by adjusting the pressure of the feed gas to a proper level of not higher than 1 atm. Whereas, for the removal of carbon monoxide present in a small amount in the feed gas, it is possible to obtain a gas freed from carbon monoxide at a higher production rate by adjusting the pressure of the feed gas to a proper level of higher than 1 atm.

It is further possible that the gas permeated through the flowable carrier membrane is further supplied to another flowable carrier membaane. In this case, two or more flowable carrier membranes are disposed in series. One of the merits of this method is that by repeating the selective separation, it is possible to obtain a gas e.g. carbon monoxide in a higher concentration. Another merit is that impurity gases in the gas mixture (such as carbon dioxide, oxygen, ammonia, hydrogensulfide, sulfur dioxide and nitrogen oxide in carbon monoxide) can be preliminarily removed by permeating the gas mixture through flowable carrier membranes reacting selectively with the respective impurity gases and then the desired gas e.g. carbon monoxide is obtained in a high purity by means of the flowable carrier membrane of the present invention. In the foregoing, the present invention has been described with respect to a flowable carrier membrane wherein the material or composition for gas separation is supported on a membrane. However, it should be understood that the supporting member for the material or composition for gas separation may not necessarily be a membrane, and it is also possible to support the material or composition on a particle-form carrier. As the particle-form carrier, various polymer materials, active carbon, silica, alumina, silica alumina, zeolite, etc. may be used.

Further, at least one of the constituents of the material or composition for gas separation i.e. at least one of the copper compound, the benzoin, the ascorbic acid, the imidazole, the pyridine and the polyethylenepolyamine may be supported on the membrane- or particle-form polymer carrier.

Now, the present invention will be described in further detail with reference to the Examples. However, it should be understood that the present invention is by no means restricted to such specific Examples.

COMPARATIVE EXAMPLES 1 to 6

Measurement (1) of the absorbed amount of carbon monoxide

A two way stop-cock and a three way stop-cock were connected to a two necked egg plant type flask (internal capacity of the space closed by the cocks: 49 ml). The two way stop-cock was connected to a gas burette, and the three way stop-cock was connected to a vacuum pump and a nitrogen supply line. Further, the gas burette was connected to a vacuum pump and a carbon monoxide supply line.

To the above egg plant type flask, a teflon rotor and a copper compound as identified in Table 1 were added, and the interior of the flask was substituted by nitrogen. Then, 2 ml of N-methylimidazole was added thereto, and the mixture was left to stand overnight. In Comparative Examples 3 and 4, the copper compounds were almost completely dissolved, while in Comparative Examples 5 and 6, the copper compounds partially remained undissolved, and in Comparative Examples 1 and 2, substantial amounts of the copper compounds remained undissolved.

The egg plant type flask containing the copper compound and N-methylimidazole was evacuated by a vacuum pump, and carbon monoxide was introduced under stirring from the gas burette, whereby the absorbed amount of carbon monoxide at 20° C. was measured periodically. The absorbed amount of carbon monoxide was calculated by subtracting the volume of carbon monoxide occupying the space in the flask except for the volume occupied by the teflon rotor, the copper compound and the N-methylimidazole from the volume measured by the gas burette.

As shown by the results in Table 1, the solution of the mixture of the copper compound and N-methylimidazole showed no ability to absorb carbon monoxide in each of Comparative Examples 1 to 6.

TABLE 1

| Comparative Examples | Copper compound | | | N—methyl-imidazole (ml) | Solubility of copper compound | Ability to absorb carbon monoxide |
| --- | --- | --- | --- | --- | --- | --- |
| | Name of compound | Chemical formula | mmol | | | |
| 1 | Cupric bromide | $CuBr_2$ | 2 | 2 | Almost insoluble | Nil |
| 2 | Cupric fluoride | $CuF_2.2H_2O$ | 2 | 2 | Almost insoluble | Nil |
| 3 | Cupric borofluoride | $Cu(BF_4)_2.6H_2O$ | 0.6 | 2 | Soluble | Nil |
| 4 | Cupric nitrate | $Cu(NO_3)_2.3H_2O$ | 0.6 | 2 | Soluble | Nil |
| 5 | Cupric formate | $Cu(CHO_2)_2.4H_2O$ | 0.6 | 2 | Partially insoluble | Nil |
| 6 | Cupric acetate | $Cu(CH_3CO_2)_2.H_2O$ | 0.6 | 2 | Partially insoluble | Nil |

EXAMPLES 1 to 4

Measurement (2) of the absorbed amount of carbon monoxide

The absorbed amount of carbon monoxide was periodically measured by the same apparatus and method as used in Comparative Examples 1 to 6 except that a solution of a mixture of a copper compound, benzoin, and N-methylimidazole having the composition as identified in Table 2 was used as the absorbing solution for carbon monoxide. The prescribed amounts of the copper compound, benzoin and N-methylimidazole were mixed and left to stand overnight in the same manner as in Comparative Examples 1 to 6, whereby the copper compound and benzoin were completely dissolved in N-methylimidazole to form a uniform solution in each of Examples 1 to 5.

The absorbed amount upon saturation of carbon monoxide varies depending upon the type of the copper compound. In Examples 1 to 4, the absorbed amount upon saturation of carbon monoxide was from 0.5 to 0.72 mol per mol of the copper compound, and the saturation was reached in from 10 to 20 minutes.

TABLE 2

| Examples | Copper compound | | | Benzoin (mmol) | N—methyl-imidazole (ml) | Absorbed amount upon saturation of CO | |
| --- | --- | --- | --- | --- | --- | --- | --- |
| | Name of compound | Chemical formula | mmol | | | CO (ml) | CO/Cu (Molar ratio) |
| 1 | Cupric fluoride | $CuF_2.2H_2O$ | 2 | 4 | 2 | 32.6 | 0.72 |
| 2 | Cupric borofluoride | $Cu(BF_4)_2.6H_2O$ | 0.6 | 2 | 3 | 8.3 | 0.62 |
| 3 | Cupric nitrate | $Cu(NO_3)_2.3H_2O$ | 0.6 | 2 | 3 | 7.7 | 0.57 |
| 4 | Cupric acetate | $Cu(CH_2CO_2)_2.H_2O$ | 2 | 4 | 2 | 29.5 | 0.66 |

TABLE 2-continued

| | Copper compound | | | Benzoin | N—methyl-imidazole | Absorbed amount upon saturation of CO | |
|---|---|---|---|---|---|---|---|
| Examples | Name of compound | Chemical formula | mmol | (mmol) | (ml) | CO (ml) | CO/Cu (Molar ratio) |
| 5 | Cupric benzoate | $Cu(C_6H_5CO_2)_2$ | 2 | 4 | 2 | 32.1 | 0.71 |
| 6 | Cupric acetylacetone | $Cu(CH_2COCH_2-COCH_3)_2$ | 2 | 4 | 2 | 28.9 | 0.65 |

EXAMPLES 7 to 19

Measurement (3) of the absorbed amount of carbon monoxide

The absorbed amount of carbon monoxide was measured in the same manner as in Examples 1 to 4 except that a reaction mixture of 2 mmol of the copper compound, 4 mmol of benzoin, 2 ml of N-methylimidazole and 2 ml of dimethylsulfoxide was used as the absorbing solution for carbon monoxide instead of the reaction mixture of 2 mmol of the copper compound, 4 mmol of benzoin and 2 ml of N-methylimidazole. The above reaction mixture was left to stand overnight after the preparation. In Examples 13, 14 and 16 to 19, the copper compounds partially remained undissolved in a solid state, while in the rest of Examples, the copper compounds were almost completely dissolved to form uniform solutions.

The absorbed amounts of carbon monoxide in the absorbing solutions containing the respective copper compounds of Examples 7 to 19 are shown in Table 3. Although the absorbed amount of carbon monoxide varies depending upon the type of the copper compound, it was within a range of from 0.70 to 0.84 mol per mol of the copper compound except for Example 16 wherein a certain amount of the copper compound remained undissolved. The saturation was reached in about 10 minutes although the absorption rate varies depending upon the type of the copper compound.

EXAMPLES 20 to 25

Measurement (4) of the absorbed amount of carbon monoxide

The absorbed amount of carbon monoxide was measured in the same manner as in Examples 1 to 17 except that a reaction mixture of 2 mmol of the copper compound, 4 mmol of benzoin and other compounds as identified in Table 4 was used as the absorbing solution for carbon monoxide. The above reaction mixture was left to stand overnight after the preparation.

Even in Examples 20 and 21 wherein no N-methylimidazole was used, the carbon monoxide absorbing ability was observed although the absorbed amounts were small. In Examples 22 and 23 wherein dimethylformamide was used instead of dimethylsulfoxide used in Examples 7 and 10, the absorbed amount of carbon monoxide was from 0.73 to 0.78 mol per mol of the copper compound.

In Example 24 wherein pyridine was used instead of N-methylimidazole in Example 4, the absorbed amount of carbon monoxide was substantially the same as in Example 4 (absorbed amount of carbon monoxide: 0.68 mol per mol of the copper compound).

In Example 25, wherein a mixture of tetraethylenepentamine and dimethylsulfoxide was used instead of N-methylimidazole in Example 4, the absorbed amount of carbon monoxide was 0.41 mol per mol of the copper compound.

TABLE 3

| Examples | Copper compound | | | Benzoin | N—methyl-imidazole | Dimethyl sulfoxide | Solubility of copper compound | Absorbed amount upon saturation of CO | |
|---|---|---|---|---|---|---|---|---|---|
| | Name of compound | Chemical formula | mmol | (mmol) | (ml) | (ml) | | CO (ml) | CO/Cu (molar ratio) |
| 7 | Cupric fluoride | $CuF_2.2H_2O$ | 2 | 4 | 2 | 2 | Soluble | 34.8 | 0.77 |
| 8 | Cupric nitrate | $Cu(NO_3)_2.3H_2O$ | 2 | 4 | 2 | 2 | Soluble | 35.1 | 0.78 |
| 9 | Cupric formate | $Cu(CHO_2)_2.4H_2O$ | 2 | 4 | 2 | 2 | Soluble | 41.2 | 0.84 |
| 10 | Cupric acetate | $Cu(CH_3CO_2)_2.H_2O$ | 2 | 4 | 2 | 2 | Soluble | 34.2 | 0.76 |
| 11 | Cupric benzoate | $Cu(C_6H_5CO_2)_2$ | 2 | 4 | 2 | 2 | Soluble | 34.7 | 0.77 |
| 12 | Cupric acetylacetone | $Cu(CH_2COCH_2-COCH_3)_2$ | 2 | 4 | 2 | 2 | Soluble | 31.3 | 0.70 |
| 13 | Cupric citrate | $Cu_2C_6H_4O_7.2.5H_2O$ | 2 | 4 | 2 | 2 | Partly insoluble | 32.1 | 0.72 |
| 14 | Cuprous chloride | $CuCl$ | 2 | 4 | 2 | 2 | Partly insoluble | 33.0 | 0.73 |
| 15 | Cuprous iodide | $CuI$ | 2 | 4 | 2 | 2 | Soluble | 32.4 | 0.71 |
| 16 | Cuprous thiocyanate | $CuSCN$ | 2 | 4 | 2 | 2 | Substantially insoluble | 23.5 | 0.52 |
| 17 | Cupric perchlorate | $Cu(ClO_4)_2.6H_2O$ | 2 | 4 | 2 | 2 | Partly insoluble | 31.8 | 0.71 |
| 18 | Cupric borofluoride | $Cu(BF_4)_2.6H_2O$ | 2 | 4 | 2 | 2 | Partly insoluble | 35.5 | 0.79 |
| 19 | Cupric sulfate | $CuSO_4.5H_2O$ | 2 | 4 | 2 | 2 | Slightly insoluble | 35.4 | 0.79 |

TABLE 4

| Examples | Copper compound Name of compound | Copper compound Chemical formula | mmol | Benzoin (mmol) | Other components | | Solubility of copper compound | Absorbed amount of saturation of CO CO (ml) | Absorbed amount of saturation of CO CO/Cu (molar ratio) |
|---|---|---|---|---|---|---|---|---|---|
| 20 | Cupric fluoride | $CuF_2.2H_2O$ | 2 | 4 | Dimethylsulfoxide | 2 ml | Substantially insoluble | 6.7 | 0.15 |
| 21 | Cupric acetate | $Cu(CH_3CO_2)_2.H_2O$ | 2 | 4 | Dimethylsulfoxide | 2 ml | Substantially insoluble | 5.5 | 0.12 |
| 22 | Cupric fluoride | $CuF_2.2H_2O$ | 2 | 4 | N—methylimidazole Dimethylformamide | 2 ml 2 ml | Soluble | 32.5 | 0.73 |
| 23 | Cupric acetate | $Cu(CH_3CO_2)_2.H_2O$ | 2 | 4 | N—methylimidazole Dimethylformamide | 2 ml 2 ml | Soluble | 35.0 | 0.78 |
| 24 | Cupric acetate | $Cu(CH_3CO_2)_2.H_2O$ | 2 | 4 | Pyridine | 2 ml | Substantially insoluble | 30.6 | 0.68 |
| 25 | Cupric acetate | $Cu(CH_3CO_2)_2.H_2O$ | 2 | 4 | Tetraethylenepentamine Dimethylsulfoxide | 1 ml 3 ml | Substantially insoluble | 18.4 | 0.41 |

EXAMPLE 26

Measurement of the absorbed amount of carbon monoxide

The absorbed amount of carbon monoxide was measured by the same apparatus and method as used in Comparative Examples 1 to 6 by using a reaction mixture of 2 ml of cupric fluoride $CuF_2.2H_2O$, 4 mmol of benzoin and 2 ml of N-methylimidazole.

The absorbed amount of carbon monoxide after 10 minutes from the initiation of supplying carbon monoxide was 23.6 ml, which corresponded to an absorbed amount of carbon monoxide of 0.53 mol per mol of cupric fluoride.

Then, the absorbed carbon monoxide was desorbed from the reaction mixture by vacuuming for 10 minutes by means of a vacuum pump, and carbon monoxide was again supplied to let the reaction mixture absorb it, whereupon the absorbed amount of carbon monoxide was measured. The absorbed amount of carbon monoxide after 10 minutes from the initiation of the supply was 22.7 ml, which corresponded to an absorbed amount of carbon monoxide of 0.51 mol per mol of cupric fluoride.

The absorbed amounts of carbon monoxide after 10 minutes in the first and second tests were substantially the same, which indicates that carbon monoxide was reversively absorbed and desorbed.

EXAMPLE 27

Measurement of the oxygen absorbing power

The oxygen absorption rate was measured by using a reaction mixture of 2 mmol of cuprous iodide, 4 mmol of benzoin, 2 ml N-methylimidazole and 2 ml of dimethylsulfoxide and the same apparatus as used in Comparative Examples 1 to 6 (provided that instead of the carbon monoxide supply line, an oxygen supply line was connected to the gas burette). In 7 minutes, 9.2 ml of oxygen was absorbed (this does not mean that the oxygen absorption reached the saturation, but the operation for oxygen absorption was stopped upon expiration of 7 minutes). The color of the reaction mixture was changed from brown to bluish green upon absorption of oxygen. The bluish green sample of the reaction mixture returned to the initial brown color in one minute when it was maintained under reduced pressure at a temperature of 70 to 80° C. Then, oxygen was again introduced, and in 14 minutes, 22.1 ml of oxygen was absorbed, whereupon the color of the sample changed to bluish green. The sample was again held under reduced pressure at a temperature of 70 to 80° C., and the sample returned to the original brown color in 8 minutes although a slightly longer period of time was required this time.

REFERENCE EXAMPLE 1

Measurement (6) of the absorbed amount of carbon monoxide

A teflon rotor was put in the same egg plant type flask having an internal capacity of 49 ml as used in Comparative Examples 1 to 6, and the interior was substituted by nitrogen. Then, 2 mmol of cuprous iodide and 2 ml of N-methylimidazole were added thereto. The mixture was stirred for about 1 hour and then evacuated by means of a vacuum pump. Then, the absorbed amount of carbon monoxide was measured by the same apparatus and method as used in Comparative Examples 1 to 6. As a result, the absorbed amount of carbon monoxide corresponding to 0.56 mol per mol of cuprous iodide was obtained.

COMPARATIVE EXAMPLE 7

Measurement (7) of the absorbed amount of carbon monoxide

In the same manner as in Reference Example 1, 2 mmol of cuprous iodide and 2 ml of N-methylimidazole were added and the mixture was stirred for about 1 hour under the nitrogen atmosphere. Then, the interior of the flask was evacuated by means of a vacuum pump, and then oxygen was introduced to atmospheric pressure. In this state, the mixture was stirred for 1 hour, and then the flask was evacuated by means of a vacuum pump. Then, the absorbed amount of carbon monoxide was measured by the same apparatus and method as used in Comparative Examples 1 to 6. As a result, the absorbed amount of carbon monoxide was as low as 0.13 mol per mol of cupric iodide. From the comparison with Reference Example 1, it is evident that the carbon monoxide absorbing power decreases when the reaction mixture of cuprous iodide and N-methylimidazole is contacted with oxygen.

EXAMPLE 28

Measurement (8) of the absorbed amount of carbon monoxide

The absorbed amount of carbon monoxide was measured in the same manner as in Comparative Example 7 except that 2 mmol of cuprous iodide, 4 mmol of benzoin and 2 ml of N-methylimidazole were added instead of 2 mmol of cupric iodide and 2 ml of N-methylimidazole. As a result, the absorbed amount of carbon monoxide was 0.59 mol per mol of cuprous iodide, thus indicating that by the addition of benzoin, the carbon mnoxide absorbing power did not decrease even when the reaction mixture was contacted with oxygen.

EXAMPLE 29

Measurement (9) of the absorbed amount of carbon monoxide

To the reaction mixture of 2 mmol of cuprous iodide and 2 ml of N-methylimidazole, the absorbed amount of carbon monoxide of which was decreased to 0.13 mol per mol of cuprous iodide by the contact with oxygen in Comparative Example 7, 4 mmol of benzoin was subsequently added and mixed, and the mixture was left to stand overnight.

Then, the absorbed amount of carbon monoxide was again measured by the same apparatus and method as used in Comparative Examples 1 to 6. As a result, the absorbed amount of carbon monoxide at a level of 0.60 mol per mol of cuprous iodide was obtained. Thus, it is evident that by the addition of benzoin, the carbon monoxide absorbing power was regained.

EXAMPLES 30 to 34

Measurement (1) of the permeabilitY 10 mmol of the copper compound as identified in Table 5, 20 mmol of benzoin, 10 ml of N-methylimidazole and 10 ml of dimethylsulfoxide were mixed and stirred for 1 hour under a nitrogen atmosphere in a 100 ml flask. The mixture was left to stand overnight to obtain a uniform solution.

On the other hand, a polytrimethylvinylsilane anisotropic membrane as a supporting membrane was mounted to a membrane cell for the measurement of gas permeability (capable of mounting a circular membrane having an effective membrane surface area of 9.84 cm2) so that the skin layer faced upward i.e. the gas supply side. The nitrogen permeation rate of this membrane was at least $10^{-4}$ cm$^3$/cm$^2$.sec.cmHg.

In the membrane cell, 10 ml of the above uniform solution was added under a nitrogen stream and contacted to the skin layer side of the polytrimethylvinylsilane anisotropic membrane, and the solution was stirred by a rotor placed on the membrane. Both the primary side (gas supply side) and the secondary side (gas permeated side) were held under reduced pressure. Then, 1 kg of a gas was supplied to the primary side, and the secondary side was vacuumed and the permeated amount of each gas permeated through the membrane was measured by gas chromatography analysis. For the measurement, a 1:1 mixture of carbon monoxide and hydrogen was used with respect to carbon monoxide and hydrogen, and pure nitrogen gas was used with respect to nitrogen. Accordingly, carbon monoxide and hydrogen were measured under a partial pressure of 0.5 kg, respectively, and nitrogen was measured under a pressure of 1 kg.

The temperature for the measurement was 30° C. In this method, the solution at the primary side was supported by a thin membrane of the skin layer of the polytrimethylvinylsilane anisotropic membrane, while the secondary side of the membrane was vacuumed. Nevertheless, no leaking of the solution during the experiment was observed.

The results of the measurement of the permeation rates of carbon monoxide, hydrogen and nitrogen and the ratios of the respective permeating rates representing the separating performance are shown in Table 5. The volume of the permeated gas was represented by the value at 0° C.

EXAMPLES 35 to 38

Measurement (2) of the permeability 12 mmol of cuprous acetate, 24 mmol of benzoin, 8 ml of N-methylimidazole and 4 ml of dimethylsulfoxide were mixed under a nitrogen stream in a 100 ml flask and stirred for 1 hour. Then, the mixture was left to stand overnight to obtain a uniform solution.

Then, 10 ml of this solution was added to a membrane cell having mounted a polytrimethylvinylsilane anisotropic membrane, and the measurement was conducted in the same manner as in Examples 30 to 34 except that as the feed gas, a gas mixture of carbon monoxide and nitrogen having the composition as identified in Table 6 was used in Examples 35 to 37 and carbon monoxide and nitrogen were used alone, respectively, in Example 38. The results of measurement of the permeation rates at the respective carbon monoxide partial pressure and nitrogen partial pressure and the separating performance are shown in Table 6.

EXAMPLES 39 to 43

Measurement (3) of the permeability

The permeability of each gas was measured by the same apparatus and method as used in Examples 30 to 34 except that a flowable carrier membrane having the composition as identified in Table 7 was used, and as the feed gas, carbon monoxide, hydrogen and nitrogen were used alone, respectively. The results are shown in Table 7.

EXAMPLES 44 and 45

Measurement (4) of the permeability

The permeability of each gas was measured by the same apparatus and method as used in Examples 30 to 34 except that the measurement was conducted in a standstill state without stirring by using a flowable carrier membrane of Example 30 wherein cupric formate was used or a flowable carrier membrane of Example 31 wherein cupric acetate was used. The results are shown in Table 8.

REFERENCE EXAMPLE 2

Measurement (5) of the permeability 10 mmol of cuprous iodide and 10 ml of N-methylimidazole were added to a 100 ml flask under a nitrogen stream, and the mixture was stirred and reacted at room temperature for 1 hour. The uniform solution thus obtained was left to stand overnight. Then, 10 ml of the solution was added to a membrane cell having mounted a polytrimethylvinylsilane anisotropic membrane, and the permeation rate of carbon monoxide was measured by the same apparatus and method as used in Examples 30 to 34, whereby it was $1.71 \times 10^{-5}$ cm$^3$/cm$^2$.sec.cmHg.

COMPARATIVE EXAMPLE 8

Measurement (6) of the permeability 10 ml of a solution obtained by reacting 10 mmol of cuprous iodide and 10 ml of N-methylimidazole in the same manner as in Reference Example 2 was added to a membrane cell. Then, the space portion of this membrane cell having an internal capacity of about 50 ml was evacuated by a vacuum pump and then oxygen was introduced to atmospheric pressure. Under this state, the solution was stirred for 1 hour, and then evacuated by a vacuum pump. Then, carbon monoxide was introduced, and the measurement was conducted in the same manner as in Examples 30 to 34, whereby the permeation rate of carbon monoxide was $5.80 \times 10^{-7}$ cm$^3$/cm$^2$·sec·cmHg. When compared with the results of Reference Example 2, the permeation rate of carbon monoxide is as low as about 1/30, thus indicating a remarkable influence of the contact with oxygen.

EXAMPLE 46

Measurement (7) of the permeation rate

The measurement was conducted in the same manner as in Comparative Example 8 except that a uniform solution obtained by reacting 10 mmol of cupric iodide, 20 mmol of benzoin and 13 ml of N-methylimidazole was used instead of 10 mmol of cupric iodide and 10 ml of N-methylimidazole. As a result, the permeation rate of carbon monoxide was $5.40 \times 10^{-6}$ cm$^3$/cm$^2$·sec·cmHg. When no oxygen was contacted, the permeation rate of carbon monoxide was $5.46 \times 10^{-6}$ cm$^3$/cm$^2$·sec·cmHg, as shown in Example 41. Thus, it is evident that by the addition of benzoin, no reduction in the permeation rate of carbon monoxide by the contact with oxygen is brought about.

TABLE 5

Facilitated transportation (1) of carbon monoxide by a copper-benzoin system flowable carrier membrane.
[Comparison of various copper compounds]
(Composition of the flowable carrier membrane: Relative to 1 mmol of copper compound, 2 mmol of benzoin, 1 ml of N—methylimidazole and 1 ml of dimethylsulfoxide)

| Examples | Copper compound in the flowable carrier membrane | | Feed gas | | Temperature for the measurement (°C.) | Permeation rates (cm$^3$/cm$^2$ · sec · cmHg) | | | Ratio of permeation rates | |
|---|---|---|---|---|---|---|---|---|---|---|
| | Name of compound | Chemical formula | | | | $Q_{CO}$ | $Q_{H2}$ | $Q_{N2}$ | $Q_{CO}/Q_{H2}$ | $Q_{CO}/Q_{N2}$ |
| 30 | Cupric formate | Cu(CHO$_2$)$_2$·2H$_2$O | CO: H$_2$: N$_2$: | 38 cmHg 38 cmHg 76 cmHg | 30 | $2.38 \times 10^{-5}$ | $5.87 \times 10^{-7}$ | $4.86 \times 10^{-7}$ | 40.5 | 49.0 |
| 31 | Cupric acetate | Cu(CH$_3$COO)$_2$·H$_2$O | CO: H$_2$: N$_2$: | 38 cmHg 38 cmHg 76 cmHg | 30 | $1.27 \times 10^{-5}$ | $7.78 \times 10^{-7}$ | $6.32 \times 10^{-7}$ | 16.7 | 20.1 |
| 32 | Cupric nitrate | Cu(NO$_3$)$_2$·3H$_2$O | CO: H$_2$: N$_2$: | 38 cmHg 38 cmHg 76 cmHg | 30 | $2.16 \times 10^{-5}$ | $6.23 \times 10^{-7}$ | $4.86 \times 10^{-7}$ | 34.7 | 44.4 |
| 33 | Cupric fluoride | CuF$_2$·2H$_2$O | CO: H$_2$: N$_2$: | 38 cmHg 38 cmHg 76 cmHg | 30 | $1.75 \times 10^{-5}$ | $5.07 \times 10^{-7}$ | $4.49 \times 10^{-7}$ | 34.5 | 39.0 |
| 34 | Cuprous iodide | CuI | CO: H$_2$: N$_2$: | 38 cmHg 38 cmHg 76 cmHg | 30 | $1.52 \times 10^{-5}$ | $6.59 \times 10^{-7}$ | $6.64 \times 10^{-7}$ | 23.1 | 22.9 |

TABLE 6

Facilitated transportation (2) of carbon monoxide by a copper compound-benzoin system flowable carrier membrane.
[Influence of the partial pressure of CO in the feed gas]
(Composition of the flowable carrier membrane: Relative to 1 mmol of cupric acetate, 2 mmol of benzoin, ⅔ ml of N—methylimidazole and ⅓ ml of dimethylsulfoxide)

| Examples | Copper compound in the flowable carrier membrane | | Feed gas | | Temperature for the measurement (°C.) | Permeation rates (cm$^3$/cm$^2$· sec · cmHg) | | Ratio of permeation rates |
|---|---|---|---|---|---|---|---|---|
| | Name of compound | Chemical formula | Pressure for the measurement | CO/ CO + N$_2$ | | $Q_{CO}$ | $Q_{N2}$ | $Q_{CO}/Q_{N2}$ |
| 35 | Cupric acetate | Cu(CH$_3$COO)$_2$·H$_2$O | CO: 16.7 cmHg N$_2$: 59.3 cmHg | 0.22 | 30 | $1.80 \times 10^{-5}$ | $2.08 \times 10^{-7}$ | 86.5 |
| 36 | Cupric acetate | Cu(CH$_3$COO)$_2$·H$_2$O | CO: 41.0 cmHg N$_2$: 35.0 cmHg | 0.54 | 30 | $1.14 \times 10^{-5}$ | $2.21 \times 10^{-7}$ | 51.6 |
| 37 | Cupric acetate | Cu(CH$_3$COO)$_2$·H$_2$O | CO: 59.3 cmHg N$_2$: 16.7 cmHg | 0.78 | 30 | $1.00 \times 10^{-5}$ | $2.22 \times 10^{-7}$ | 45.0 |
| 38 | Cupric acetate | Cu(CH$_3$COO)$_2$·H$_2$O | CO: 76 cmHg N$_2$: 76 cmHg | CO,N$_2$ each pure gas | 30 | $1.43 \times 10^{-5}$ | $4.23 \times 10^{-7}$ | 33.8 |

TABLE 7

Facilitated transportation (3) of carbon monoxide by a copper compound-benzoin system flowable carrier membrane

| Examples | Composition of the flowable carrier membrane | | | | Feed gas | Temperature for the measurement (°C.) |
|---|---|---|---|---|---|---|
| | Copper compound (mmol) | Benzoin (mmol) | N—methyl-imidazole (ml) | Dimethyl sulfoxide (ml) | | |

TABLE 7-continued

Facilitated transportation (3) of carbon monoxide by a copper compound-benzoin system flowable carrier membrane

| 39 | Cupric acetate (1) | 1.6 | 1   | 0   | CO:   | 76 cmHg | 30 |
|----|--------------------|-----|-----|-----|-------|---------|----|
|    |                    |     |     |     | $H_2$: | 76 cmHg |    |
|    |                    |     |     |     | $N_2$: | 76 cmHg |    |
| 40 | Cupric fluoride (1)| 2.0 | 1   | 0   | CO:   | 76 cmHg | 30 |
|    |                    |     |     |     | $N_2$: | 76 cmHg |    |
| 41 | Cuprous iodide (1) | 2.0 | 1.3 | 0   | CO:   | 76 cmHg | 30 |
|    |                    |     |     |     | $N_2$: | 76 cmHg |    |
| 42 |                    | 0.5 | 1   | 0   | CO:   | 76 cmHg | 30 |
|    |                    |     |     |     | $N_2$: | 76 cmHg |    |
| 43 | Cupric formate (1) | 2.0 | 0.5 | 0.5 | CO:   | 76 cmHg | 30 |
|    |                    |     |     |     | $N_2$: | 76 cmHg |    |

| Examples | Permeation rates ($cm^3/cm^2 \cdot sec \cdot cmHg$) | | | Ratio of permeation rates | |
|---|---|---|---|---|---|
|   | $Q_{CO}$ | $Q_{H2}$ | $Q_{N2}$ | $Q_{CO}/Q_{H2}$ | $Q_{CO}/Q_{N2}$ |
| 39 | $9.37 \times 10^{-6}$ | $2.87 \times 10^{-7}$ | $2.38 \times 10^{-7}$ | 32.6 | 39.4 |
| 40 | $9.28 \times 10^{-6}$ | — | $1.97 \times 10^{-7}$ | — | 47.1 |
| 41 | $5.46 \times 10^{-6}$ | — | $2.08 \times 10^{-7}$ | — | 26.3 |
| 42 | $1.31 \times 10^{-5}$ | — | $4.90 \times 10^{-7}$ | — | 26.7 |
| 43 | $1.86 \times 10^{-5}$ | — | $1.79 \times 10^{-7}$ | — | 103.9 |

TABLE 8

Facilitated transportation of carbon monoxide by a copper compound-benzoin system flowable carrier membrane
[Permeability coefficient, diffusion constant and solubility coefficient of CO by the carrier membrane in a standstill state]
(Composition of the flowable carrier membrane: Relative to 1 mmol of copper compound, 2 mmol of benzoin, 1 ml of N—methylimidazole and 1 ml of dimethylsulfoxide)

| Examples | Copper compound in the flowable carrier membrane | | Thickness of the membrane ($\mu m$) | Feed gas | Temperature for the measurement (°C.) |
|---|---|---|---|---|---|
|  | Name of compound | Chemical formula | | | |
| 44 | Cupric formate | $Cu(CHO_2)_2 \cdot 2H_2O$ | 2640 | CO: 76 cmHg | 30 |
| 45 | Cupric acetate | $Cu(CH_3COO)_2 \cdot H_2O$ | 2640 | CO: 76 cmHg | 30 |

| Examples | Carbon monoxide | | | Remarks | |
|---|---|---|---|---|---|
|  | Permeability coefficient ($cm^3 \cdot cm/cm^2 \cdot sec \cdot cmHg$) | Diffusion constant | Solubility coefficiency | Permeation rates*[1] ($cm^3/cm^2 \cdot sec \cdot cmHg$) | $CO/Cu$*[2] (molar ratio) |
| 44 | $1.61 \times 10^{-7}$ | $2.73 \times 10^{-6}$ | $5.90 \times 10^{-2}$ | $2.38 \times 10^{-5}$ | 0.84 |
| 45 | $1.19 \times 10^{-7}$ | $2.45 \times 10^{-7}$ | $4.86 \times 10^{-2}$ | $1.27 \times 10^{-5}$ | 0.76 |

*[1]See Table 5
*[2]See Table 3

COMPARATIVE EXAMPLES 9 to 11

Measurement (1) of the absorbed amount of carbon monoxide

A two way stop-cock and a three way stop-cock were connected to a two necked egg plant type flask (internal capacity of the space closed by the cocks: 49 ml). The two way stop-cock was connected to a gas burette, and the three way stop-cock was connected to a vacuum pump and a nitrogen supply line. Further, the gas burette was connected to a vacuum pump and a carbomonoxide supply line.

To the above egg plant type flask, a teflon rotor and a copper compound as identifed in Table 9 were added, and the interior of the flask was substituted by nitrogen. Then, 2 ml of N-methylimidazole was added thereto, and mixed for one hour under stirring, and the mixture was left to stand overnight. In Comparative Example 9, the copper compounds were almost completely dissolved, while in Comparative Example 10, the copper compounds partially remained undissolved, and in Comparative Example 11, substantial amounts of the copper compounds remained undissolved.

The egg plant type flask containing the copper compound and N-methylimidazole was evacuated by a vacuum pump, and carbon monoxide was introduced under stirring from the gas burette, whereby the absorbed amount of carbon monoxide at 20° C. was measured periodically. The absorbed amount of carbomonoxide was calculated by subtracting the volume of carbon monoxideoccupying the space in the flask except for the volume occupied by the teflon rotor, the copper compound and the N-methylimidazole from the volume measured by the gas burette.

As shown by the results in Table 9, the solution of the mixture of the copper compound and N-methylimidazole showed no ability to absorb carbon monoxide in each of Comparative Examples 9 to 11.

TABLE 9

| Comparative Examples | Copper compound | | | N—methylimidazole (ml) | Solubility of copper compound | Ability to absorb carbon monoxide |
|---|---|---|---|---|---|---|
|  | Name of compound | Chemical formula | mmol | | | |
| 9  | Cupric nitrate   | $Cu(NO_3)_2 \cdot 3H_2O$     | 0.6 | 2 | Soluble | Nil |
| 10 | Cupric acetate   | $Cu(CH_3COO)_2 \cdot H_2O$   | 0.6 | 2 | Partially insoluble | Nil |
| 11 | Cupric fluoride  | $CuF_2 \cdot 2H_2O$          | 2   | 2 | Almost | Nil |

TABLE 9-continued

| Comparative Examples | Copper compound | | | N—methyl-imidazole (ml) | Solubility of copper compound | Ability to absorb carbon monoxide |
|---|---|---|---|---|---|---|
| | Name of compound | Chemical formula | mmol | | | |
| | | | | | insoluble | |

EXAMPLES 47 to 51

The absorbed amount of carbon monoxide was periodically measured by the same apparatus and method as used in Comparative Examples 9 to 11 except that a reaction mixture of 2 mmol of the copper compound as identified in Table 2, 4 mmol of L-ascorbic acid and other compound as identified in Table 10 was used as the carbon monoxide absorbing solution. The prescribed amounts of the copper compound, L-ascorbic acid and other compound as identified in Table 10 were mixed and left to stand overnight in the same manner as in Comparative Examples 9 to 11. With respect to each carbon monoxide absorbing solution having its own composition, the absorbed amount upon saturation of carbon monoxide and the mol amounts of absorbed carbon monoxide per mol of the copper compound are shown in Table 10.

Into solution A, 28 ml of air ($O_2$: 0.25 mmol) was blown, whereupon the solution underwent a color change from yellowish brown to green thus indicating that the copper compound was oxidized (solution C). To solution C, 10 ml of solution B (Pd: 0.5 mmol) was added, and the mixture was heated to 65° C., whereupon the green color was changed to reddish brown, thus indicating that the copper compound was reduced (solution D).

The absorbed amount of carbon monoxide of solution D was measured, whereby it was found that 0.67 mol of carbon monoxide was absorbed per mol of the copper compound.

Into solution D, 28 ml of air ($O_2$: 0.25 mmol) was blown, and the mixture was reacted at a temperature of from 50 to 60° C. for 10 minutes. The color of solution was again changed to green by the oxidation of the copper compound (solution E).

TABLE 10

| Examples | Copper compound | | | L-ascorbic acid (mmol) | Other components | | Solubility of copper compound | Absorbed amount upon saturation of CO | |
|---|---|---|---|---|---|---|---|---|---|
| | Name of compound | Chemical formula | mmol | | | | | CO (ml) | CO/Cu (molar ratio) |
| 47 | Cupric nitrate | $Cu(NO_3)_2.3H_2O$ | 2 | 4 | N—methylimidazole Dimethylsulfoxide | 2 ml 2 ml | Soluble | 29.2 | 0.65 |
| 48 | Cupric acetate | $Cu(CH_3COO)_2.H_2O$ | 2 | 4 | same as above | | Partially insoluble | 14.0 | 0.31 |
| 49 | Cupric fluoride | $CuF_2.2H_2O$ | 2 | 4 | N—methylimidazole Dimethylformamide | 2 ml 2 ml | Slightly turbid | 31.8 | 0.71 |
| 50 | Cuprous iodide | CuI | 1.9 | 0.60 | N—methylimidazole | 1.9 ml | Slightly turbid | 24.3 | 0.57 |
| 51 | Cupric borofluoride | $Cu(BF_4)_2.6H_2O$ | 0.9 | 0.60 | N—methylimidazole | | | 10.89 | 0.54 |

The absorbed amount of carbon monoxide was measured in the same manner as in Comparative Example 7 except that 1.9 mmol of cuprous iodide, 0.60 mmol of L-ascorbic acid and 2.9 ml of N-methylimidazole were added instead of 2 mmol of cupric iodide and 2 ml of N-methylimidazole. As a result, the absorbed amount of carbon monoxide was 0.51 mol per mol of cupric iodide. As shown in Reference Example 1, when no oxygen was added, the absorbed amount of carbon monoxide was 0.56 mol per mol of cupric iodide. From the comparison with this, it is evident that when L-ascorbic acid is added, no reduction in the carbon monoxide absorbing power by the contact with oxygen takes place.

EXAMPLE 53

Into a 50 ml flask, 0.5 mmol of copper formate, 0.5 mmol of benzoin and 2 ml of N-methylimidazole were introduced and reacted at a temperature of from 50° to 60° C. for 30 minutes to obtain a yellowish brown solution (solution A). Into a 200 ml flask, 6 mmol of palladium chloride and 120 ml of acetonitrile were introduced and reacted under a nitrogen atmosphere at room temperature for one day and night under stirring. Then, 20 ml thereof was introduced into a separate flask having a capacity of 50 ml and reacted at a temperature of from 50° to 60° C. for 40 minutes while blowing ethylene in to obtain a solution (solution B).

The absorbed amount of carbon monoxide in solution E was 0.21 mol per mol of the copper compound. Thus, the absorbing power for carbon monoxide was remarkably reduced by the oxidation of the copper compound.

Finally, 10 ml of solution B (Pd: 0.5 mmol) was again added to solution E, and the mixture was heated to 70° C. and reacted for 20 minutes while blowing ethylene in (solution F).

The absorbed amount of carbon monoxide in solution F was 0.56 mol per mol of the copper compound. As compared with the carbon monoxide absorbing power of solution D, the power was found to have been recovered by about 84%.

Thus, the reaction mixture useful for gas separation of the present invention can be advantageously used for the separation of carbon monoxide. For example, it is thereby possible to separate mainly carbon monoxide in a high yield from a synthesis gas obtained by the steam reforming or partial oxidation of hydrocarbons such as natural gas, light naphtha or heavy oil, or from a gas mixture containing carbon monoxide obtainable by the gasification of coal or as an iron making byproduct gas, and to use the separated carbon monoxide as a starting material for various chemical reactions.

What is claimed is:

1. A material for gas separation obtained by mixing a copper compound and a benzoin and/or an ascorbic acid in a solvent.

2. The material for gas separation according to claim 1, wherein the solvent is at least one member selected from the group consisting of an imidazole, a pyridine and a polyethylenepolyamine.

3. The material for gas separation according to claim 2, wherein at least one of the copper compound, the benzoin, the ascorbic acid, the imidazole, the pyridine and the polyethylenepolyamine is bound to or supported on a membrane- or particle-form polymer carrier.

4. A selective gas permeation membrane comprising a supporting membrane and a material for gas separation as defined in claim 1, supported thereon.

5. A method for gas separation, wherein a selective gas permeation membrane as defined in claim 4 is used.

6. A method for gas separation, wherein a material for gas separation as defined in claim 1 is used as a selective gas absorbing solution.

7. A method for gas separation, wherein a material for gas separation as defined in claim 1 is used for separating carbon monoxide in good yield from a gas mixture containing carbon monoxide.

8. A composition for gas separation comprising (a) a reaction mixture obtained by mixing a copper compound and a benzoin and/or an ascorbic acid in a solvent and (b) a reaction mixture obtained by mixing a palladium compound and an alkene in a solvent.

9. The composition for gas separation according to claim 8, wherein the solvent is at least one member selected from the group consisting of an imidazole, a pyridine and a polyethylenepolyamine.

10. The composition for gas separation according to claim 9, wherein at least one of the copper compound, the benzoin, the ascorbic acid, the imidazole, the pyridine and the polyethylenepolyamine is bound to or supported on a membrane- or particle-form polymer carrier.

11. A selective gas permeation membrane comprising a supporting membrane and a composition for gas separation as defined in claim 8, supported thereon.

12. A method for gas separation, wherein a selective gas permeation membrane as defined in claim 11 is used.

13. A method for gas separation, wherein a composition for gas separation as defined in claim 8 is used as a selective gas absorbing solution.

14. A method for gas separation, wherein a composition for gas separation as defined in claim 8 is used for separating carbon monoxide in good yield from a gas mixture containing carbon monoxide.

15. A composition for gas separation comprising (a) a reaction product of oxygen with a reaction mixture obtained by mixing a copper compound and a benzoin and/or an ascorbic acid in a solvent and (b) a reaction mixture obtained by mixing a palladium compound and an alkene in a solvent.

16. The composition for gas separation according to claim 15, wherein the solvent is at least one member selected from the group consisting of an imidazole, a pyridine and a polyethylenepolyamine.

17. The composition for gas separation according to claim 16, wherein at least one of the copper compound, the benzoin, the ascorbic acid, the imidazole, the pyridine and the polyethylenepolyamine is bound to or supported on a membrane- or particle-form polymer carrier.

18. A selective gas permeation membrane comprising a supporting membrane and a composition for gas separation as defined in claim 15, supported thereon.

19. A method for gas separation, wherein a selective gas permeation membrane as defined in claim 18 is used.

20. A method for gas separation, wherein a composition for gas separation as defined in claim 15 is used as a selective gas absorbing solution.

21. A method for gas separation, wherein a composition for gas separation as defined in claim 15 is used for separating carbon monoxide in good yield from a gas mixture containing carbon monoxide.

* * * * *